United States Patent
Tse et al.

(10) Patent No.: US 10,936,895 B2
(45) Date of Patent: Mar. 2, 2021

(54) MANAGING CAMERA ACTIONS

(71) Applicant: VMware, Inc., Palo Alto, CA (US)

(72) Inventors: Kar Fai Tse, Peachtree Corners, GA (US); Erich Peter Stuntebeck, Marietta, GA (US); Chaoting Xuan, Duluth, GA (US)

(73) Assignee: VMware, Inc., Palo Alto, CA (US)

( * ) Notice: Subject to any disclaimer, the term of this patent is extended or adjusted under 35 U.S.C. 154(b) by 119 days.

(21) Appl. No.: 15/659,997

(22) Filed: Jul. 26, 2017

(65) Prior Publication Data
US 2019/0034751 A1   Jan. 31, 2019

(51) Int. Cl.
| | | |
|---|---|---|
| G06K 9/00 | (2006.01) | |
| G06K 9/34 | (2006.01) | |
| G06F 21/62 | (2013.01) | |
| G06Q 10/10 | (2012.01) | |
| H04N 5/232 | (2006.01) | |
| G06K 9/78 | (2006.01) | |
| G06K 9/22 | (2006.01) | |

(52) U.S. Cl.
CPC ......... *G06K 9/344* (2013.01); *G06F 21/6245* (2013.01); *G06K 9/00469* (2013.01); *G06K 9/22* (2013.01); *G06K 9/78* (2013.01); *G06Q 10/10* (2013.01); *H04N 5/232* (2013.01); *G06K 2209/01* (2013.01)

(58) Field of Classification Search
USPC ....................................................... 382/182
See application file for complete search history.

(56) References Cited

U.S. PATENT DOCUMENTS

| | | | | |
|---|---|---|---|---|
| 2005/0246351 A1* | 11/2005 | Hadley | ............... | G06F 17/3071 |
| 2009/0037515 A1* | 2/2009 | Zapata | ................ | H04L 43/0811 |
| | | | | 709/202 |
| 2014/0105510 A1* | 4/2014 | Chelst | .................. | G06Q 40/125 |
| | | | | 382/218 |
| 2014/0331333 A1* | 11/2014 | Frost | ....................... | G06F 21/62 |
| | | | | 726/28 |
| 2016/0042249 A1* | 2/2016 | Babenko | ............ | G06K 9/00744 |
| | | | | 382/170 |
| 2016/0210040 A1* | 7/2016 | Bai | ......................... | G06F 3/017 |
| 2017/0083785 A1* | 3/2017 | Warsawski | ........ | G06F 17/30011 |
| 2017/0212910 A1* | 7/2017 | Morris | ................ | G06F 16/5838 |
| 2017/0337493 A1* | 11/2017 | Paramasivan | ...... | G06Q 10/0633 |

* cited by examiner

*Primary Examiner* — Stephen P Coleman
(74) *Attorney, Agent, or Firm* — Thomas Horstemeyer, LLP

(57) ABSTRACT

Disclosed are various embodiments that relate to a system or a method for managing individual actions. In one embodiment, among others, a system includes a client device and program instructions executable in the client device. The program instructions, when executed, cause the client device to identify an action that stores an image in a memory associated with the client device, where the action is executed by way of the client computing device. The program instructions also cause the client device to generate image tags that describe the image. The client device can determine that the image has enterprise content based at least in part on the image tags and perform an enterprise action on the image. The enterprise action can be based on an enterprise category associated with the image tags and an enterprise policy.

20 Claims, 6 Drawing Sheets

MANAGING CAMERA ACTIONS

BACKGROUND

With the emergence of bring-your-own-device (BYOD) technology in the workplace, companies permit employees or other personnel to use their own devices for business purposes. Devices can be used to access enterprise data, such as email and corporate documents. However, prior to an employee using his or her own device in the workplace, a company can require the employee to enroll with a management service capable of protecting enterprise data from theft, loss, and unauthorized access. Administrators of the management service can utilize the management service to oversee operation of the devices enrolled with or otherwise managed by the service.

A device can interact with a management service through an agent application. For instance, the agent application can oversee the safe installation and execution of other types of applications, such as word processing applications, spreadsheet applications, or other applications. However, employees may not want their devices restricted by management service policies which can be inconvenient or privacy invasive. Other approaches may require users to actively select enterprise applications to perform enterprise related tasks. The user may forget to do so when multiple applications accomplish similar tasks, or consciously disregard a management policy in favor of a preferred personal application to accomplish their enterprise tasks.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
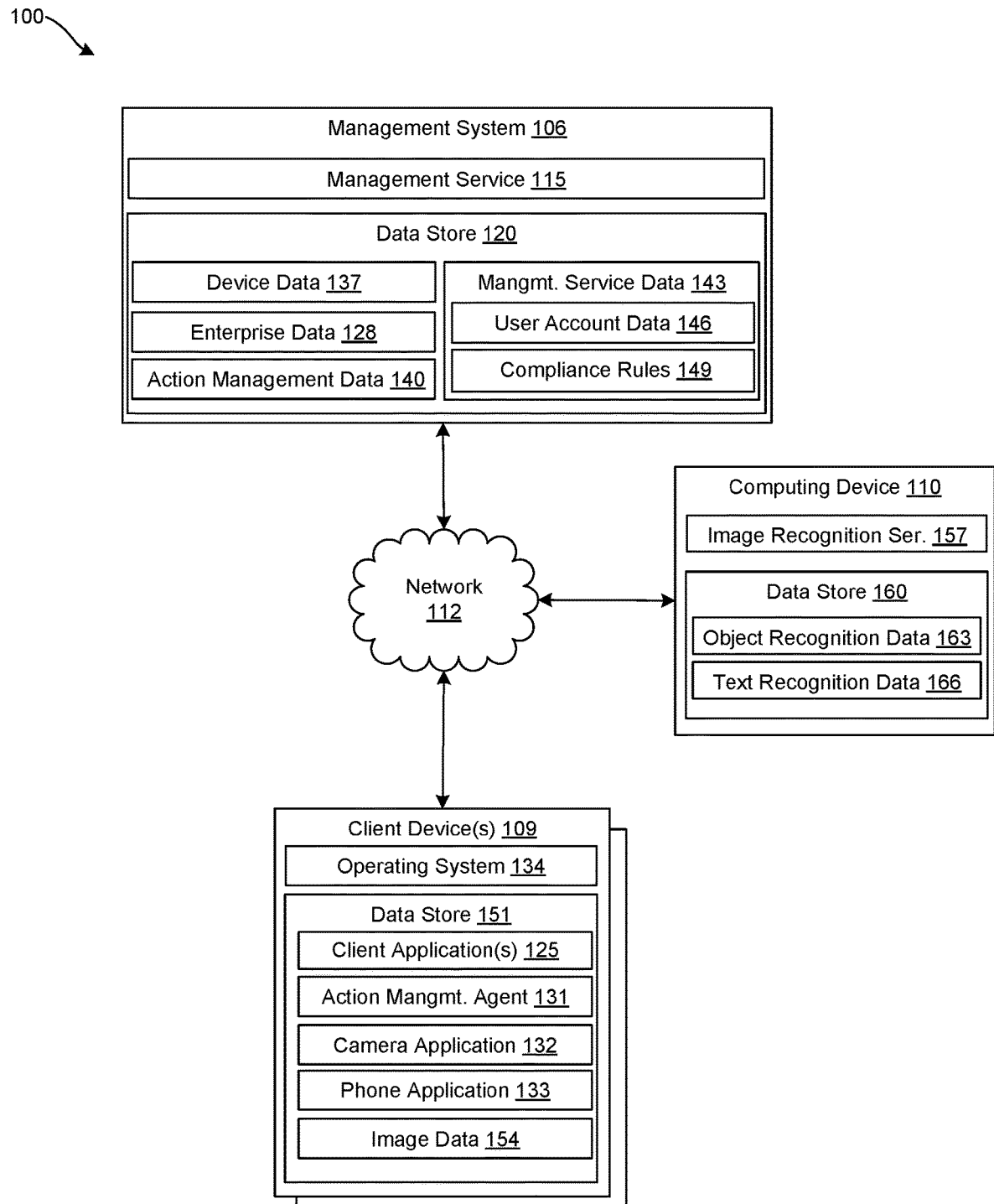
FIG. 1 is a drawing of an example of a networked environment, including a management system, a computing device, and a client device.

The present disclosure relates to an enterprise management of individual actions and data generated from those actions occurring on a client device. Previously, enterprise management of mobile devices comprised container-level and application-level management. However, these approaches require that users must actively select enterprise applications to perform enterprise related tasks. Users may neglect to initiate an enterprise application when multiple applications accomplish similar tasks, or users may consciously disregard an enterprise policy for a company in favor of a preferred personal application to accomplish their enterprise tasks.

Various embodiments of the present disclosure relate to managing individual enterprise actions, user intent, and their associated data rather than an entire application or the device as a whole. Managing the actions and its data can enable users to accomplish some of the most common tasks on a mobile device in familiar ways, whether for enterprise or personal use. In addition, managing the individual actions also allows the generated data associated with the action to be appropriately secured if deemed an enterprise action.

Various types of actions can be individually managed on a client device, such as a mobile phone, a laptop, a tablet, and other suitable client devices. As one example, an action can comprise capturing an image using a camera associated with a client device. In one embodiment, among others, an agent executed on the client device can identify an action that stores an image in a memory associated with the client device. The action is performed using the client device. The agent can facilitate generating image tags that describe the image and determine whether the image has enterprise content. Subsequently, the agent can determine whether the image is associated with an enterprise category, such as a business card, a receipt, a business graphic, presentation slides, or meeting notes. The agent also performs an enterprise action on the image based at least in part on the identified enterprise category associated with the image and an enterprise policy associated with the identified enterprise category.

Actions can be considered as tasks both within and across applications, allowing the agent to capture within this model multi-app workflows that may not currently be managed by existing enterprise management implementations. In addition, other examples of actions include responding to or initiating a text message, enterprise use of a native phone dialer, and taking a picture and then texting it to a colleague. For example, by predicting the intent of an action within the phone dialer to be either work or personal, the agent can take the appropriate actions while still allowing the user to initiate calls using a familiar method, whether or not the intended action is actually completed within that app.

In addition, the various embodiments of the present disclosure can also determine whether individual actions should be managed by an enterprise policy based on factors related to the context of the circumstances in which the image was captured, not merely the content of the image. For example, various embodiments can make a determination based on Geofence boundaries, a time of day, a day of the week, calendar and GPS data to determine if the action is business or personal. Even mobile data, like app usage data, could be used to build a more accurate approach for classifying an image as an enterprise image and assigning an appropriate enterprise category.

With reference to FIG. 1, shown is an example of a networked environment 100. The networked environment 100 can include a management system 106, client device(s) 109, and a computing device 110 in communication with one another over a network 112. The management system 106 can provide an enterprise with access to email, corporate documents, social media, and other enterprise content.

The network 112 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, cellular networks, telephony networks, and other types of networks. The computing device 110 can provide access to additional computing power for specific tasks related to analyzing images, such as object recognition, text extraction, and other image processing functionality.

The management system 106 can include a server computer or any other system providing computing capability. Alternatively, the management system 106 can include a plurality of computing devices that are arranged, for example, in one or more server banks, computer banks, or other arrangements. The management system 106 can include a grid computing resource or any other distributed computing arrangement. The computing devices can be located in a single installation or can be distributed among many different geographical locations. The management system 106 can also include or be operated as one or more virtualized computer instances. For purposes of convenience, the management system 106 is referred to in the singular. Even though the management system 106 is referred to in the singular, it is understood that a plurality of management systems 106 can be employed in the various arrangements as described above. As the management system 106 communicates with the client device 109 remotely over the network 112, the management system 106 can be described as a remote management system 106 or a collection of one or more remote computing devices.

The management system 106 can include a data store 120. The data store 120 can include memory of the management system 106, mass storage resources of the management system 106, or any other storage resources on which data can be stored by the management system 106. The data store 120 can include one or more databases, such as a structured query language (SQL) database, a non-SQL database, or other appropriate databases. The data stored in the data store 120, for example, can be associated with the operation of the various applications or functional entities described below.

The components executed on the management system 106 can include, for example, a management service 115, as well as other applications, services, processes, systems, engines, or functionality not discussed in detail herein. The management service 115 can be executed to oversee the operation of client devices 109 enrolled (or to be enrolled) with the management service 115. In addition, the management service 115 can be executed to oversee the management of individual actions being performed on the client device 109. The actions and the data generated from these actions can be managed according to an enterprise policy.

In some embodiments, an enterprise, such as one or more companies or other organizations, can operate the management service 115 to oversee or manage the operation of the client devices 109 of its employees, contractors, customers, students, or other users having user accounts with the enterprise. An enterprise can be any customer of the management service 115, and such an enterprise can also be referred to as an organization. The enterprise or organization can have a hierarchy. A hierarchy can be an organizational structure that links the individuals and/or groups in the enterprise. For example, an individual or group can be responsible for management of one or more subordinate individuals or groups, who can in turn be responsible for management of one or more subordinate individuals or groups, and so on.

The management service 115 can cause various software components to be installed on the client device 109. Such software components can include, for example, client application(s) 125, an action management agent 131, resources, libraries, drivers, or other similar components that require installation on the client device 109 as specified by an administrator of the management service 115. The management service 115 can further cause policies to be implemented on the client device 109. Policies can include, for example, restrictions or permissions pertaining to capabilities of a client device 109 such that access to enterprise data 128 is secured on the client device 109.

The management service 115 can interact with one or more client applications 125 executed on the client device 109 to perform management functions. In one example, the management service 115 can interact with the action management agent 131 to enroll a client device 109 with the management service 115. When enrolled, the action management agent 131 can be registered as a device administrator of the client device 109, which can provide the action management agent 131 with sufficient privileges to control the operation of the client device 109. In one example, the action management agent 131 can be registered as the device administrator through the installation of a management profile at an operating system 134 that causes the operating system 134 to designate the action management agent 131 as the device administrator.

The management service 115 can direct the action management agent 131 to perform various device management functions on the client device 109. For example, the management service 115 can direct the action management agent 131 to control access to certain software or hardware functions available on the client device 109. As a result, the management service 115 can verify that the configuration and operation of the client device 109 is in conformance with predefined criteria that ensures that enterprise data 128 or other data, is protected from data loss, unauthorized access, or other harmful events. In one embodiment, among others, the management service 115 can instruct the action management agent 131 to observe particular actions being executed on the client device 109. Actions may include capturing an image with an image capture device, detecting phone calls with a phone application, transmitting text messages with a text messaging application, transmitting data files over a wireless network interface, and other suitable actions that can be executed on the client device 109.

The management service 115 can further provision enterprise data 128 to the client device 109 through the action management agent 131. In one example, the management service 115 can cause the action management agent 131 to control use of the client device 109 or to provision enterprise data 128 to the client device 109 through use of a command queue provided by the management service 115. In some examples, the management service 115 can store commands in a command queue associated with a particular client device 109 and can configure the action management agent 131 executed by such client device 109 to retrieve the contents of the command queue. In one example, the action management agent 131 can be configured to retrieve the contents of the command queue on a configured interval, such as every four hours, or upon detection of a certain event, such as an unauthorized application being executed by the client device 109. The management service 115 can also push commands to the action management agent 131 over the network 112.

In any case, the action management agent 131 can receive the contents of the command queue from the management service 115. In one example, the contents of the command queue can include a command that the action management agent 131 should cause to be executed on the client device 109. In another example, the contents of the command queue can include a resource or a client application 125 that the action management agent 131 should cause to be installed on the client device 109, which the client device 109 can access through a specified uniform resource locator (URL).

The data stored in the data store 120 can include, for example, enterprise data 128, device data 137, action management data 140, management service data 143, as well as other data. The enterprise data 128 can include email, corporate documents, confidential documents, social media, messages, enterprise applications, and other enterprise content or communications. The management service 115 can be employed to manage and control access to the enterprise data 128 associated with an enterprise. The management service 115 can provide systems and applications with access based on user accounts, user groups, device data 137, compliance rules 149, and other information.

The device data 137 can include indications of the state of the client device 109. In one example, these indications can specify applications that are installed on the client device 109, configurations or settings that are applied to the client device 109, user accounts associated with the client device 109, the physical location of the client device 109, the network to which the client device 109 is connected, and other information describing the current state of the client device 109.

The action management data 140 can include data related to the management of individual actions that are observed on the client devices 109. The action management data 140 may include indications of the types of actions that are observed, action enterprise policies that instruct how enterprise actions are processed, storage for enterprise action data, storage location indications, and other suitable data related to the management of the enterprise actions.

The management service data 143 can include, for example, user account data 146, compliance rules 149, as well as other data. The user account data 146 can include information pertaining to end users of the client devices 109 enrolled with the management service 115. For instance, the user account data 146 can include data used to authenticate an end user, such as a username, password, email address, biometric data, device identifier, registry identifier, or other data. Additionally, the user account data 146 can include other information associated with an end user, such as name, organization unit, or other information. Each user account can be associated with a particular entity, such as an enterprise, employer, or other entity.

The compliance rules 149 can include constraints specified by an administrator for compliance of a client device 109 with the management service 115. Particularly, the compliance rules 149 software and hardware restrictions for the client device 109. s In one example, the action management agent 131 can configure hardware or software functionality of a client device 109 such that the client device 109 is in conformance with the compliance rules 149. For instance, an administrator can specify whether Bluetooth®, camera, microphone, or related functions are permitted on the client device 109. Additionally, the action agent management 131 can identify when the client device 109 is not in conformance with the compliance rules 149, as well as other policies, and can take appropriate remedial actions, such as denying access to enterprise data 128, restricting access to particular networks, or enabling or disabling other functionality of the client device 109 of the action management agent 131.

The client device 109 can be representative of one or more client devices 109. The client device 109 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 109 can also be equipped with networking capability or networking interfaces, including a localized networking or communication capability, such as a near-field communication (NFC) capability, radio-frequency identification (RFID) read or write capability, or other localized communication capability.

The client device 109 can include an operating system 134 configured to execute various client applications 125, such as the action management agent 131, a camera application 132, a phone application 133, and any other client applications 125. Some client applications 125 can access network content served up by the management system 106 or other servers, thereby rendering a user interface on a display, such as a liquid crystal display (LCD), touchscreen display, or other type of display device. To this end, some client applications 125 can include a web browser or a dedicated application, and a user interface can include a network page, an application screen, or other interface. Further, other client applications 125 can include device management applications, enterprise applications, social networking applications, word processors, spreadsheet applications, media viewing applications, or other applications.

In some examples, at least a portion of the client applications 125 are "managed applications" where the action management agent 125 oversees or controls operation of the client applications 125. For instance, using an administrator console, an administrator of the management service 115 can distribute, secure, and track client applications 125 installed on client devices 109 enrolled with the management service 115. In some examples, the action management agent 131 can configure and verify that managed applications operate in conformance with the compliance rules 149.

The client device 109 can include a data store 151. The data store 151 can include memory of the client device 109 or any other storage resources on which data can be stored by the client device 109. The data store 151 can include the client application 125, the action management agent 131, the camera application 132, the phone application 133, and image data 154. The data stored in the data store 151, for example, can be associated with the operation of the various applications or functional entities described below.

The action management agent 131 can detect the initiation of individual actions being executed on the client device 109. Particularly, the action management agent 131 can identify the initiation of actions occurring in native applications and third party applications. The action management agent 131 can execute in the background while other applications are executed in the foreground. In other words, the action management agent 131 can identify particular actions that may involve enterprise data 128 while native or third party applications are executing. As a non-limiting example, an action may include capturing an image with an image capture device with a native or third camera application, storing an image captured by the image capture device, initiating a text message or a phone call to an enterprise contact, and other suitable enterprise actions. The action management agent 131 can interact with the management service 115 to determine which enterprise actions will be observed, which enterprise actions generates data that should be stored in a secure location, where the generated data should be stored, and whether to delete data generated from the enterprise action.

The camera application 132 can render a user interface used for capturing images and/or videos using an image capture device coupled to the client device. The phone application 133 can render user interfaces for initiating telephone calls and storing contact information.

The image data 154 can include image and/or video data associated with a photo library, a video library, camera storage, and other suitable data locations for images and videos. For example, the image data 154 can represent data stored from capturing an image using a camera coupled to the client device 109. The image data 154 can also represent a storage location on the client device 109 for images that were transmitted to the client device 109.

The computing device 110 can provide computing capability for specific tasks, such as executing an image recognition service 157. The computing device 110 may implement one or more machine learning algorithms for identifying patterns and analyzing data. The computing device 110 can include a server computer or any other system providing computing capability. Alternatively, the computing device 110 can include a plurality of computing devices that are arranged, for example, in one or more server banks, computer banks, or other arrangements. The computing device 110 can include a grid computing resource or any other distributed computing arrangement. The computing devices 110 can be located in a single installation or can be distributed among many different geographical locations. The computing device 110 can also include or be operated as one or more virtualized computer instances. For purposes of convenience, the computing device 110 is referred to in the singular. Even though the computing device 110 is referred to in the singular, it is understood that a plurality of computing devices 110 can be employed in the various arrangements as described above. As the computing device 110 communicates with the client device 109 remotely over the network 112, the computing device 110 can be described as a remote computing device or a collection of one or more remote computing devices.

The image recognition service 157 can be executed by the client device 109 by initiating an application programming interface (API) call. The image recognition service 157 can receive images or videos as input. In response, the image recognition service 157 can transmit to the client device 109 one or multiple image tags that describe the image or video. In addition, the image recognition service 157 can transmit a confidence score associated with each image tag. The confidence score represents a degree of likelihood that the image tag accurately describes the image.

The computing device 110 may include a data store 160. The data store 160 can include memory of the computing device 110 or any other storage resources on which data can be stored and/or accessed by the computing device 110. The data store 160 can include, for example, object recognition data 163, text recognition data 166, as well as other data. The object recognition data 163 can include data related to identifying objects in images. For example, the object recognition data 163 can facilitate the identification of enterprise images, such as business cards, receipts, handwritten notes, meeting notes, presentation slides, documents with confidential markings, and other suitable enterprise materials. Particularly, the object recognition data 163 can be used to identify enterprise objects within the image 206 (FIG. 2), such as objects that relate to a business card, receipt, handwritten notes, meeting notes, confidential markings, presentation slides, and other suitable enterprise objects. The text recognition data 166 can facilitate the extraction of text from an identified enterprise image. In addition, the text recognition data 166 can identify, from the extracted text, text entities, such as a name, address, an email address, a phone number, a title of a document, and other suitable text entities.

Next, a general description of the operation of the various components of the networked environment 100 is provided. A user of the client device 109 can use his or her device in a bring your own device (BYOD) environment, where the client device 109 is enrolled with the management service 115. In some scenarios, the enrollment process may involve installing the action management agent 131 on the client device 109.

Traditionally, an enterprise solution involves a container-level or application-level approach. For example, in order to access an enterprise email account, a user may be required to use a specific enterprise email application on the client device 109. In another example, a user may be required to use a specific enterprise camera application for taking pictures of enterprise content on the client device 109.

Various embodiments of the present disclosure relate to enabling the detection and management of actions being performed with native or non-enterprise related applications. In other words, the various embodiments relate to managing specific actions that can be performed on the client device 109 regardless of the application invoking the action. As a non-limiting example, a user may initiate a native camera application on a mobile device to take a picture of a business card. After taking the picture, the action management agent 131 can identify the captured picture as an action in response to storing the picture in a memory of the mobile device. For example, the action management agent 131 detects the captured picture as an action because the picture was saved in a photo library for the mobile device. In one embodiment, the action management agent 131 can identify the storing of an image to memory based on media content observer function calls associated with an operating system 134 of the mobile device. For example, both Android and Apple's iOS provide observers for their photo libraries, ContentObserver (MediaStore) and PHPhotoLibraryChangeObserver, respectively. Android allows applications to run indefinitely in the background as a service. iOS allows best effort background execution by using the background fetch to run the observer locally. Thus, users can take pictures using the native or third-party camera applications and the action management agent 131 can detect a picture was stored in memory. Storing in memory causes the action management agent 131 to initiate a process for determining whether the stored image has enterprise content and whether an enterprise policy should be applied to the image. In another embodiment, the action management agent 131 can detect the action of capturing of the image with an camera application.

The action management agent 131 can generate one or multiple image tags that describe the captured image. In some embodiment, among others, the action management agent 131 can invoke an image recognition service 157 to generate the image tags by using an API associated with the image recognition service 157. In addition, the image recognition service 157 generates a confidence score associated with each image tag. The confidence score represents a degree of confidence that the image tag accurately describes the image. Some non-limiting examples of an image recognition service 157 may include Google Cloud, Microsoft Cognitive Services, Clarifai Image and Vision API, and IBM Watson. The action management agent 131 receives the image tags and the confidence scores from the image recognition service 157. Although FIG. 1 illustrates that the image recognition service 157 is executed by the computing device 110, one skilled in the art appreciates that the image recognition service 157 can also be installed and executed on the client device 109 or the management system 106.

The action management agent 131 can predict or determine from the image tags whether the captured image should be classified as an enterprise image. For the purposes of this discussion, the enterprise image can represent an image that has enterprise content. Thus, a compliance or enterprise policy can be applied to the image. For example, an enterprise image may include an image of a business card, a business receipt, presentation slides, meeting notes, a paper, documents with confidential markings, and other suitable enterprise related images. The action management agent 131 can determine whether the image has enterprise content based on the image tags, and in some cases, the confidence scores of the image tags. In some embodiments, among others, the confidence score may be factored into the determination of whether the captured image is an enterprise image based on whether the confidence score exceeds a score threshold.

The action management agent 131 can determine that the image is associated with one or more enterprise categories based at least in part on the plurality of image tags. In one embodiment, among others, the action management agent 131 can use the confidence scores as well to determine whether the enterprise image is associated with one or more enterprise categories. For example, the captured image may be an image of a business card. The image recognition service 157 can receive the captured image as input from the client device 109. The image recognition service 157 can transmit to the client device 109 multiple image tags that describe the business card. Some examples of the image tags may include "business," "rectangular," "business logo," "business address," "name," and other suitable tags. In this example, the image recognition service 157 may provide a confidence score of 80% for one or more tags. The action management agent 131 can then determine whether the enterprise image should be associated with a business card enterprise category based on image tags being highly correlated to the enterprise category and/or the confidence score of 80% exceeds a 75% threshold for the enterprise category.

In another non-limiting example, the action management agent 131 can generate an output vector of image tags t and an output vector of confidence scores c. The action management agent 131 can determine that the image 206 is an enterprise image, B.

$$B \mid (t, c) = \sum_{i=0}^{n} f(c_i, t_i)$$

where the result is true or 1 if the image 206 is an enterprise image and false of 0 if the image 206 is a personal image. Furthermore, the decision f, is defined as follows:

$$f(c, t) = (t \in \{\text{'business'}\} \hat{} (c > 0.8)) \rightarrow 1$$

where the function returns true or 1 if the image tag t is an element of the set business AND (^) the confidence score c, is higher than the threshold 0.8. In addition, the decision function f(c, t) can further be generalized to be:

$$f_k(c, t) = (t \in T_k \hat{} (c > C_k)) \rightarrow 1$$

where $f_k(c, t)$ is the decision function for classification k. $T_k$ is the set of image tags that are required to define classification k, and $C_k$ is the minimum threshold for the confidence score c. The decision function returns 1 is true or 0 if false.

Once the image has been determined to be enterprise related, the action management agent 131 can further identify the image 206 as associated with one of the enterprise categories, such as receipt R, business card BC, slide presentation S, or notes N. Given the output of vectors t and c, the action management agent 131 can define an identification function I to identify each image. For each k, there can be an identification function $I_k$, as a product of the function, $f_k$:

$$I_k(c, t) = \prod_{i=0}^{n} f_k(c_i, t_i)$$

where $k \in \{R, BC, S, N\}$.

The set of required image tags T for each classification are as follows:

$T_R = \{\text{'business'}, \text{'commerce'}\}$ $T_{BC} = \{\text{'business'}, \text{'card'}\}$ $T_S = \{\text{'business'}, \text{'graphic'}, \text{'presentation'}\}$ $T_N = \{\text{'business'}, \text{'writing'}, \text{'handwriting'}\}$.

Further, the action management agent 131 can perform an enterprise action on the image based at least in part on the determined enterprise category of the image and an enterprise policy associated with the business card enterprise category. As a non-limiting example, an enterprise action may include extracting content from the enterprise image and identifying content elements from the extracted content, such as a name of a person, a company name, a business address, an email address, a company title, a phone number, and other content components. The identified content elements can be stored in a template associated with the enterprise category. For example, the extracted business card data can be stored in a phone contact template in the client device 109. In some embodiments, the enterprise image can be deleted from the memory of the client device after extracting the content and storing extracted text in a template. In other embodiments, the enterprise action may include storing the enterprise image in the data store 120 associated with the management system 106 and deleting the enterprise image from memory associated with the client device 109. For example, in iOS, the action management agent 131 can use PHAssetChangeRequest deleteAsset to delete the image 206 from the data store associated with the client device 109, and in Android, the action management agent 131 can delete the image 206 from a secure digital (SD) Card storage.

In another embodiment, among others, the action management agent 131 can classify an image as an enterprise image, without using an image tag. In this embodiment, the action management agent 131 can identify an action that stores an image in a memory associated with the client device 109, where the action is executed by way of the client device 109.

Next, the action management agent 131 can determine that the image is an enterprise image based on an image knowledge base. The image knowledge base can be stored in a memory of the client device 109. The image knowledge base can be generated from a machine learning model, where the machine learning model is trained by providing sample enterprise images for analysis. For example, the action management agent 131 can detect that the stored image is an image of a business card based on the image knowledge base. In some cases, the action management agent 131 can compare the image with the sample enterprise images. In other cases, the action management 131, by way of the image knowledge base, can determine a method for detecting various different types of enterprise images from the sample enterprise images. The image knowledge base can be developed from determining common aspects for each type of an enterprise image. For example, the image knowledge base can detect different aspect traits associated with a business card, a receipt, a slide presentation, and other suitable enterprise materials.

Then, the action management agent 131 can determine that the image is associated with one of the enterprise categories. The action management agent 131 can identify aspects in the image that are associated with one of the enterprise categories. For example, the action management agent 131 can determine that the image should be classified as a business card because it detects aspects in the image that relates to the business card category, such as the rectangular shape of card and the associated text on the card. These image aspects can be stored in the image knowledge base.

Then, the action management agent 131 can execute an enterprise action on the image based on the identified enterprise category. As previously discussed, the enterprise action can include extracting the text in the image and deleting the image from a memory in the client device 109. In other cases, the action management agent 131 can store the enterprise image in a secured data store 120 and delete the image from a memory of the client device 109. Thus, in this embodiment, the action management agent 131 can use an image knowledge base, developed from a machine learning model, to classify an image as an enterprise image without the use of image tags.

In another non-limiting example, the action management agent 131 can classify the image as an enterprise image using a text classifier. Particularly, after detecting an image has been stored, text in the image can be extracted, analyzed, and used to classify the image as an enterprise image using a text classifier. Then, an enterprise action can involve saving the extracted text in a word document format. Then, the word document and the original image of the document can be stored in a secured, managed data store 120.

In another non-limiting example, an enterprise action could involve transferring the image or the extracted text from the image to another application or networked application service. For example, if the action management agent 131 detects that the image is an enterprise image and is associated with a receipt enterprise category, the enterprise action can involve transmitting the image to a managed data store 120 and a networked application service, such as Concurr®, for processing of the receipt image. In another example, the image can be classified as a powerpoint slide and transmitted to SlideShare® or LinkedIn®.

As another example, the captured image can be of a person or a group of people. The action management agent 131 can use a face detection technique to classify the image as an enterprise image. The face detection technique can be used to determine that the detected faces are associated with a particular enterprise using a corporate directory. The enterprise action can involve transmitting the image to an application such as Socialcast® or Slack®. Then, the person associated with each detected face can be tagged using the corporate directory. In some scenarios, the image of the person or group can be deleted from a memory associated with the client device 109.

In another example, the image can be of a matrix barcode, such as a Quick Response (QR) Code®. The matrix barcode can be linked to a web site address. The action management agent 131 can classify the image as an enterprise image based on analyzing the web site address associated with the matrix barcode. In some cases, the web site address can classified using a whitelist of enterprise websites or metadata associated with the web site address. In addition, if the image of the matrix barcode is classified as an enterprise image, then the action management agent 131 can perform additional security checks on the web site address, e.g. checking certificates, and notifying the management service 115 of any detected concerns.

Figure 2A:
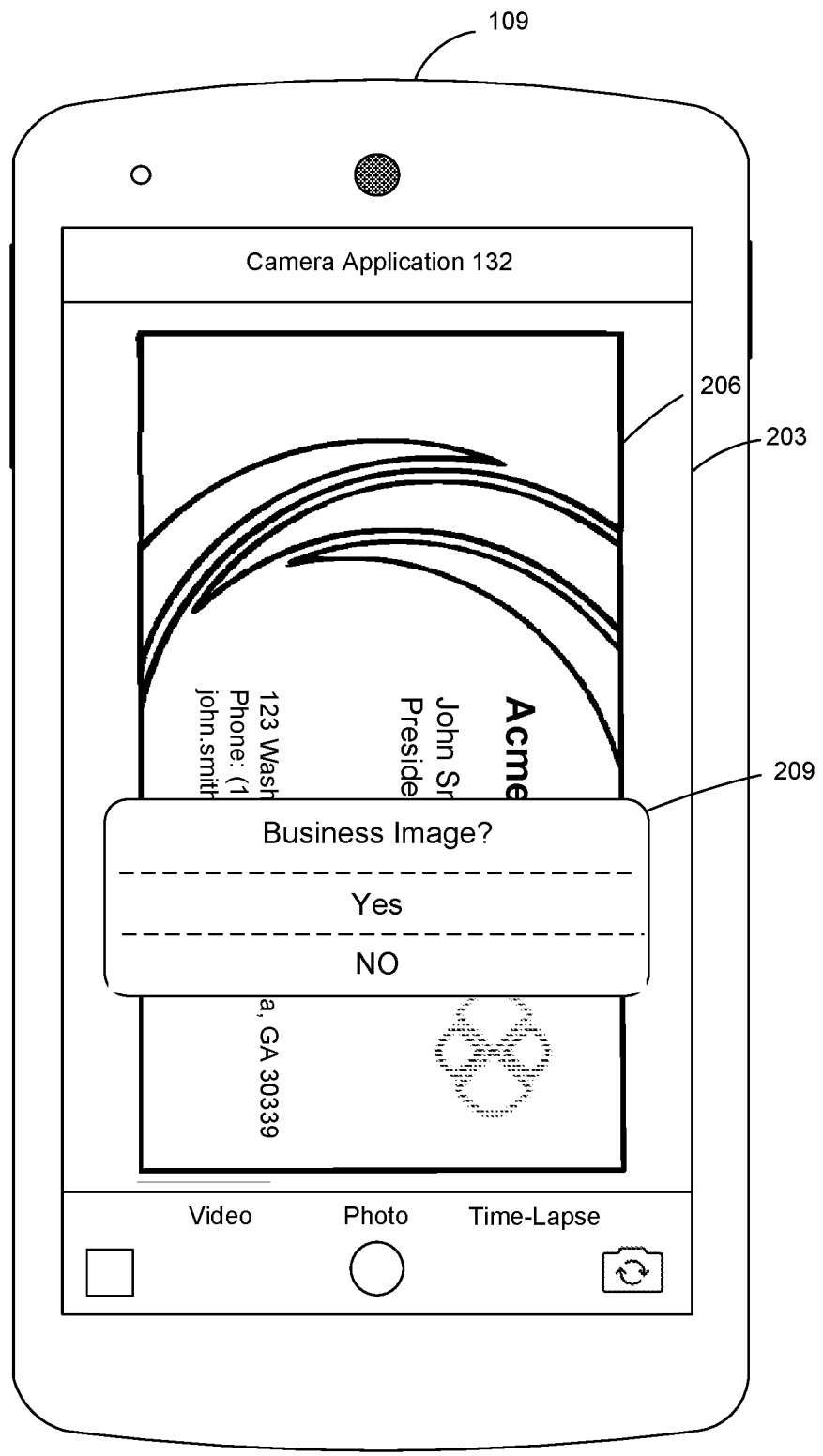
FIGS. 2A and 2B are example user interfaces for determining an enterprise image and a type of enterprise image in a native camera application executed on the client device.

With reference to FIG. 2A, shown is an example user interface of the camera application 132. In FIG. 2A, a camera user interface 203 is illustrated as being rendered on a display of the client device 109. The camera user interface 203 illustrates that an image 206 of a business card was taken. The action management agent 131 can detect that the image 206 has been stored in a data store 151 associated with the client device 109. In one embodiment, among others, upon detecting the storing of the image 206, the action management agent 131 can generate one or more image tags that describe the image 206, and the action management agent 131 can generate a confidence score associated with each tag. The action management agent 131 can predict whether the image 206 is a personal image or an enterprise image based on the image tags and the associated confidence scores. As illustrated in FIG. 2A, the action management agent 131 has determined that the image 206 is an enterprise image. In some embodiments, the action management agent 131 may further base this determination on a location of the client device 109 and a time of day the picture was taken. For example, the action management agent 131 can determine that the image 206 has enterprise content if the image 206 was captured at a known enterprise location or likely enterprise location, such as a customer location, a company campus, a convention center location, and other suitable enterprise locations. The time of day the picture was taken can also be factor. For example, if the picture was taken between 8:00 AM-5:00 PM on a Monday-Friday, then the action management agent 131 use this data in favor of the picture being an enterprise image.

The action management agent 131 renders a user interface verification component 209 to verify that the image 206 is an enterprise image with the user. Alternatively, if the captured image 206 is not determined to be an enterprise image, then the user interface verification component 209 is not rendered in the display, and the camera application 132 operates as it typically does. The user can manipulate either the "Yes" or "No" menu element. If the "Yes" element is selected, the action management agent 131 proceeds with applying an enterprise policy to the image 206. If the "No" element is selected, then the user interface verification component 209 is removed from the display and the camera application 132 operates as it typically does.

Figure 2B:
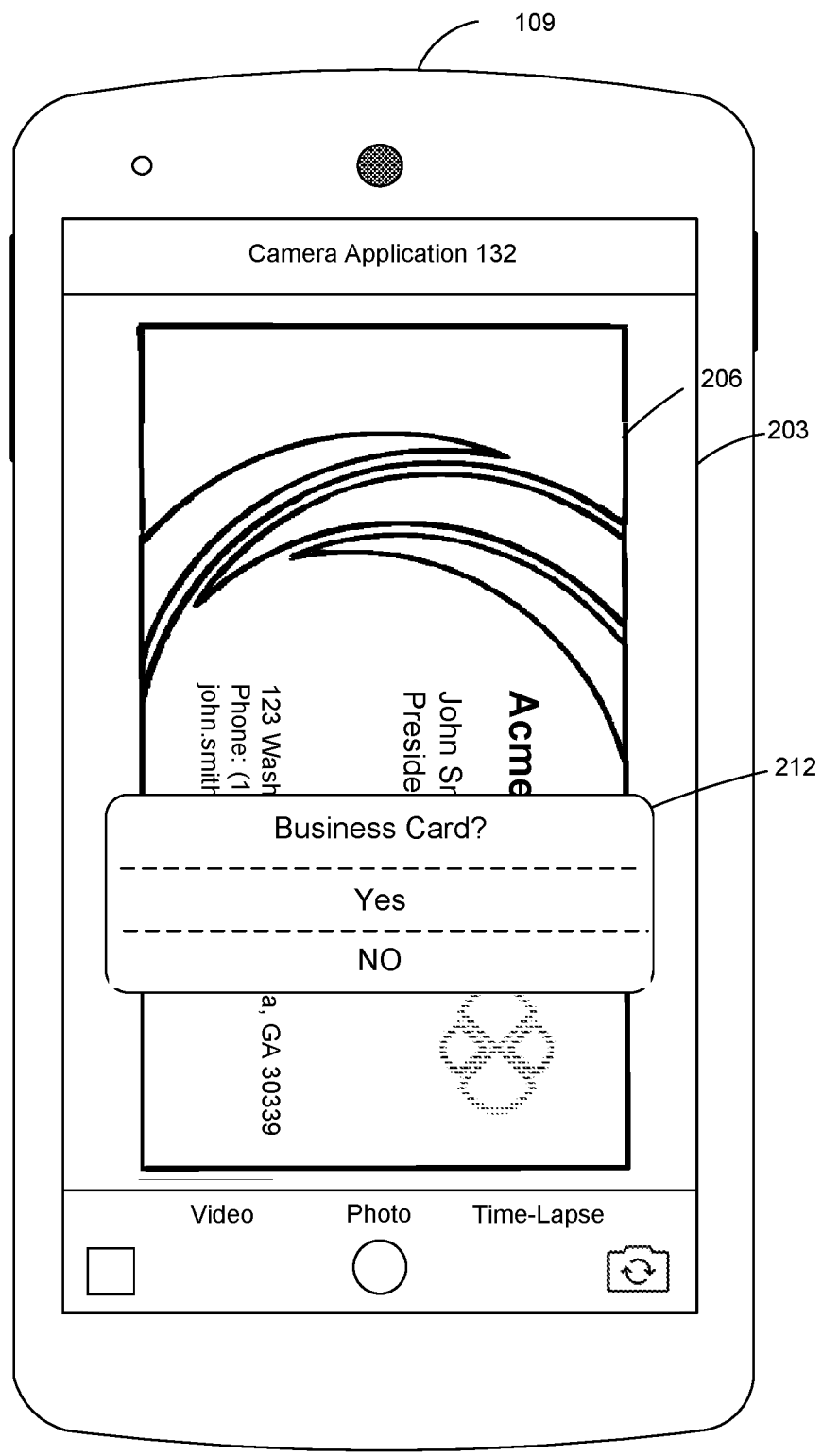

Next, with reference to FIG. 2B, shown is another example user interface of the camera application 132. FIG. 2B illustrates a classification user interface component 212 that is rendered in response to user manipulating the "Yes" element from FIG. 2A. The action management agent 131 classifies the image 206 by associating the image 206 with one of the enterprise categories. In FIG. 2B, the action management agent 131 has determined that the image 206 is a business card. The action management agent 131 can make this determination based on the image tags and the associated confidence scores.

For example, the action management agent 131 can determine that the image 206 should be associated with a business card enterprise category by identifying one or more specific image tags that correlate with the business card category. For the image 206, the generated image tags may be "business card," "company logo," "individual name," "mailing address," and "rectangular card." The action management agent 131 may have one or a combination of these image tags as highly correlated to a "business card" category. In addition, the confidence scores for each individual image tag can factor into the determination, as one can appreciate.

In FIG. 2B, if the user manipulates the "No" element, then the action management agent 131 may attempt to suggest another enterprise category or allow the user to manually enter an enterprise category through the user interface. Alternately, if the user manipulates the "Yes" element, the action management agent 131 can proceed to extracting content from the image 206. In some embodiments, after verifying an enterprise category, the action management agent 131 may omit an extraction step and store the image 206 at a secure data store, such as the data store 120 that is associated with the management system 106. In other words, after verifying or entering an enterprise category, the action management agent 131 proceeds to execute a process for managing the image 206 that is associated with the enterprise category.

Figure 2C:
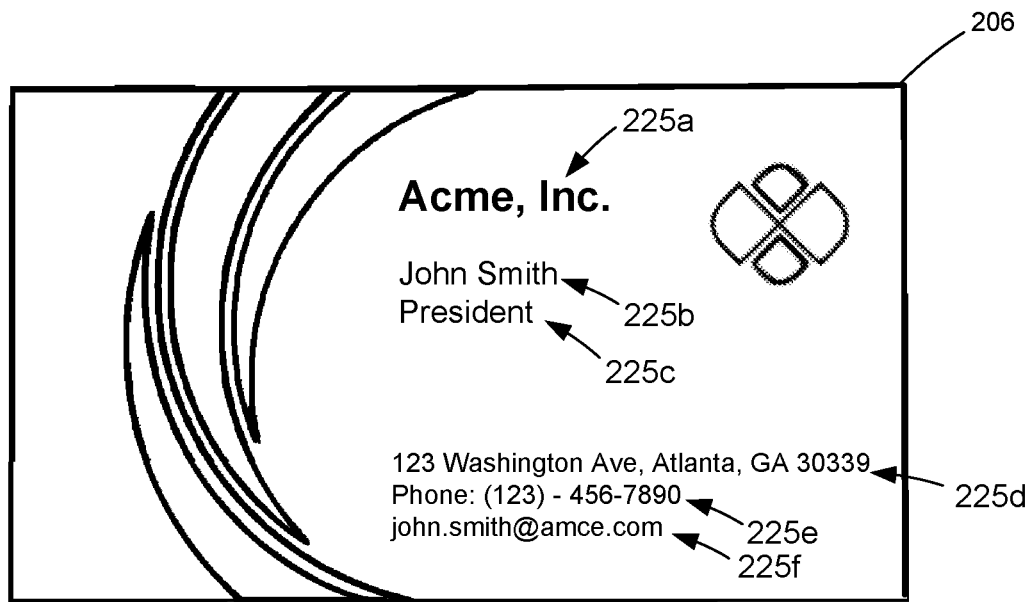
FIG. 2C is an example of text extraction from a business card image.

With reference to FIG. 2C, shown an example of text extraction from the image 206. Continuing with the previous example, the action management agent 131 has received verification that the image 206 is associated with a business card category. FIG. 2C illustrates portions of text that are extracted from the image 206.

With regard to extraction, the action management agent 131 can employ an optical character recognition service to extract the text from the image 206. In one embodiment, among others, the action management agent 131 may use Tesseract Optical Character Recognition, and Image Binarisation also be used to improve edge detection of the text. As one skilled in the art would appreciate, other optical character recognition services may be employed.

In FIG. 2C, reference numbers 225a-225f refer to different text components that are extracted from the image 206. After the text is extracted, the action management agent 131 can employ an entity extraction service to parse and classify the extracted aspects of text. For example, reference number 225a refers to "Acme, Inc.," in which the entity extraction service can identify "Acme, Inc." as a company name. Reference numbers 225b and 225c refer to "John Smith" and "President," respectively. The entity extraction service can classify these text elements as a name and a job title. In addition, reference number 225d refers to "123 Washington Ave, Atlanta, G 30339," which can be identified as an address. Reference number 225e refers to "(123)-456-7890," which can be identified as a phone number. Reference number 225f refers to "john.smith@amce.com," which can be identified as an email address. In many scenarios, the content in the enterprise image is valuable and the image 206 by itself may not have much value. Therefore, in these scenarios, after extracting the content, the image 206 may be deleted from the data store 151 associated with the client device 109.

Figure 2D:
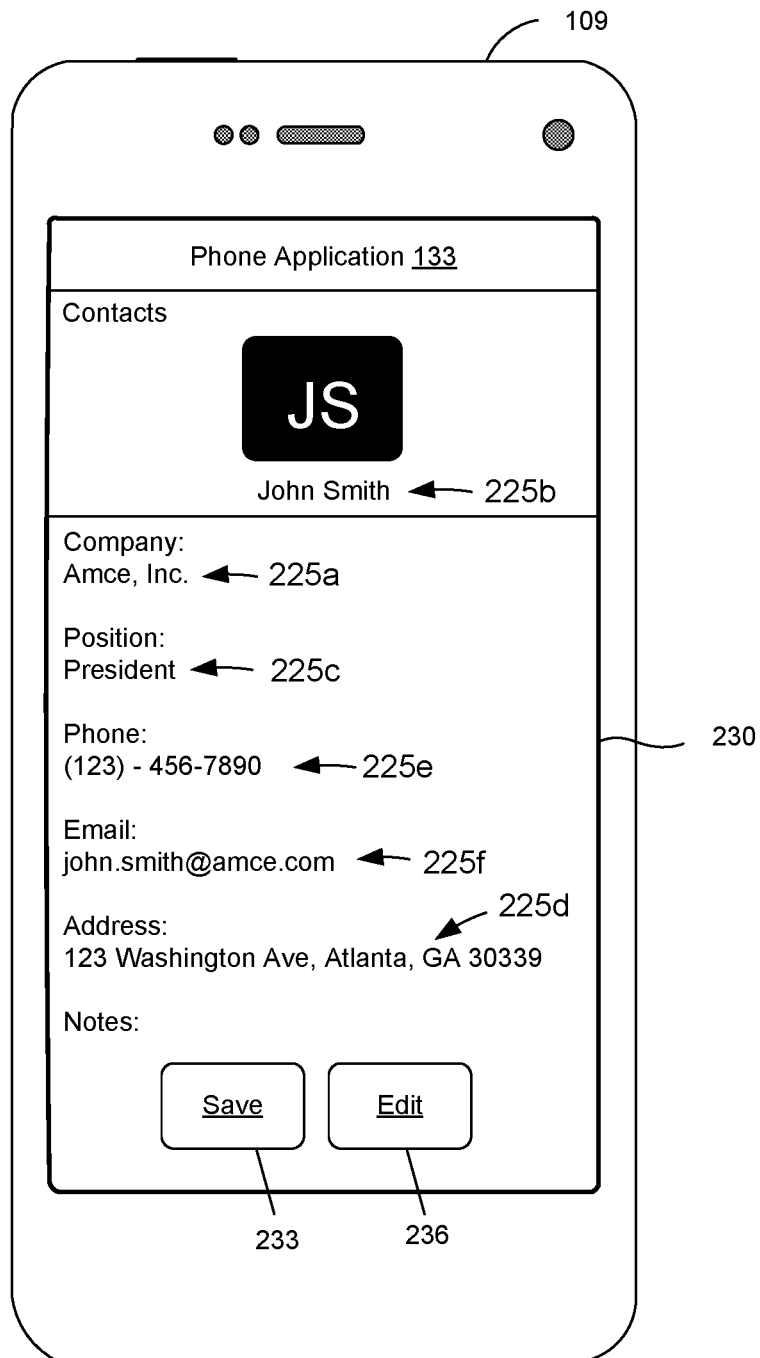
FIG. 2D is an example user interface for storing the extracted text in a contact template.

With reference to FIG. 2D, shown is an example user interface of a phone application 133. Continuing with the previous example, the action management agent 131 has extracted content from the image 206 and identified multiple entities within the extracted text. FIG. 2D illustrates a phone user interface 230 for viewing, storing, and editing contact information. The phone user interface 230 illustrates a contact record that has been populated with the extracted content information. Particularly, the individual extracted text components 225a-22f have been inserted into a corresponding location in the contact record. The user can either manipulate a first user interface component 233 for storing the contact record in the data store associated with the client device 109 or a second user interface component 236 that enable the user to edit the extracted text in the contact record. After the contact record is stored, the client device 109 can return to a typical operating manner.

Figure 3:
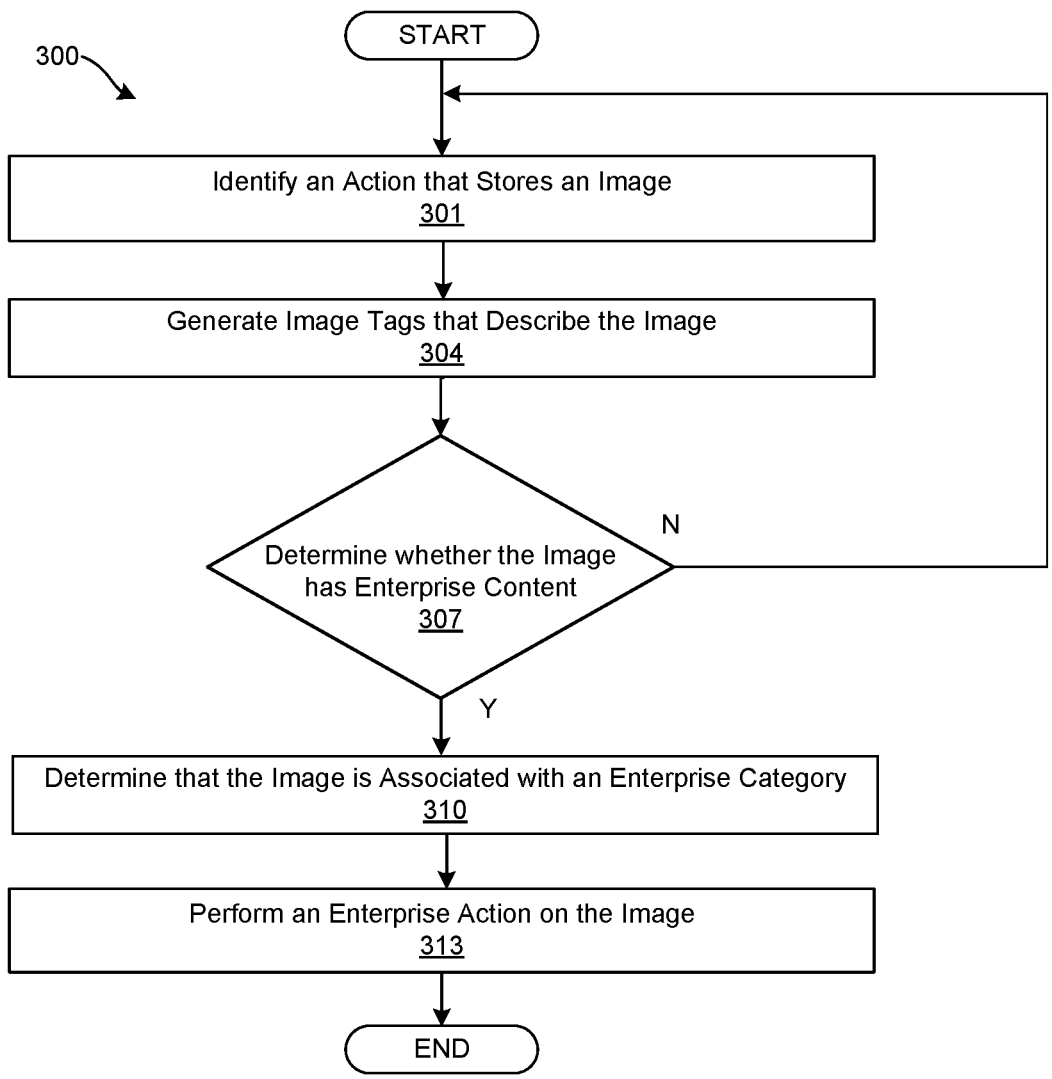
FIG. 3 is an example flowchart illustrating functionalities implemented by an action management agent executed in the client device.

Referring next to FIG. 3, shown is a flowchart 300 that provides one example of the operation of a portion of the action management agent 131 according to various embodiments. It is understood that the flowchart 300 of FIG. 3 provides merely an example of the many different types of functional arrangements that may be employed to implement the operation of the portion of the action management agent 131 as described herein. As an alternative, the flowchart 300 of FIG. 3 may be viewed as depicting an example of elements of a method implemented in the management system 106 (FIG. 1) according to one or more embodiments.

Beginning with step 301, the action management agent 131 identifies an action that stores an image in a memory associated with the client device 109, where the action is performed using the client device 109. In some embodiments, the action management agent 131 detects the initiation of the action, such as the initiation of capturing an image by an image capture device.

In step 304, the action management agent 131 generates image tags that describe the image. In some embodiments, the action management agent 131 can transmit the image 206 over the network 112 to the image recognition service 157. Then, the action management agent 131 can receive from the image recognition service 157 one or multiple image tags and the associated confidence scores. In some embodiments, the image tags and the confidence scores can be generated using an image recognition application executed in the client device 109 or the management system 106.

In step 307, the action management agent 131 can determine whether the image 206 has enterprise content based at least in part on the image tags and/or the confidence scores. If the image 206 is determined not have enterprise content, the action management 131 can proceed back to step 301. Alternatively, if the image 206 is determined to be an enterprise image, then the action management agent 131 can proceed to step 310.

In step 310, the action management agent 131 can determine whether the image is associated with one of multiple predefined enterprise categories based at least in part on the image tags and/or the confidence scores. In this step, the action management agent 131 can make this determination based on whether it identifies image tags and/or confidence scores with a high correlation for an enterprise category. This may include determining whether the confidence scores exceed a score threshold for an enterprise category.

In step 313, the action management agent 131 can perform an enterprise action on the image based at least in part on the identified enterprise category associated with the image and an enterprise policy associated with the identified enterprise category. The enterprise policy can define instructions for how the image 206 should be processed. For example, if the image 206 is associated with the business card category, then the contact information from the business card image 206 should be extracted and then the business image 206 should be deleted. In some cases, the enterprise policy may involve storing the image 206 in a secured data store 120 associated with the management system 106 and deleting the image 206 from the data store associated with the client device 109. Then the action management agent 131 proceeds to the end of this process.

The client devices 109 or devices comprising the management system 106 can include at least one processor circuit, for example, having a processor and at least one memory device, both of which couple to a local interface, respectively. The device can include, for example, at least one computer, a mobile device, smartphone, computing device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In this case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which user interface(s) generated by the client application(s) 125 or another application can be rendered. The client device 109 can also include one or more input/output devices that can include, for example, a capacitive touchscreen or other type of touch input device, fingerprint reader, or keyboard.

Although the management service 115, the client applications 125, the action management agent 131, the camera application 132, the phone application 133, and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show examples of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system, comprising:
   a client computing device; and
   program instructions executable in the client computing device that, when executed by the client computing device, cause the client computing device to:
   identify an action that stores an image in a memory associated with the client computing device;
   generate at least one image tag that describes the image;
   determine that the image has enterprise content based on the at least one image tag and an image capture location for the image being within an enterprise location area;
   determine that an enterprise policy applies to the enterprise content, the enterprise policy specifying that the image should be deleted from the memory of the client computing device;
   store the image in a secured data store; and
   delete the image from the memory of the client computing device.

2. The system of claim 1, further comprising program instructions executable in the client computing device that, when executed, further cause the client computing device to:
   extract content from the image using optical character recognition;
   identify a plurality of content elements from the content based at least in part on the at least one image tag; and
   store the plurality of content elements in a template associated with the image, the template being stored in the secured data store.

3. The system of claim 1, wherein the action comprises capturing of the image using an image capture device coupled to the client computing device.

4. The system of claim 1, wherein the action is detected using a content observer function associated with a photo library and executed by an operating system of the client computing device.

5. The system of claim 1, wherein generating the at least one image tag is based on using an image recognition application programming interface (API) associated with an image recognition service.

6. The system of claim 1, wherein generating the at least one image tag further comprises generating a confidence score associated with the at least one image tag, wherein the confidence score represents a degree of likelihood that the at least one image tag describes the image.

7. The system of claim 6, further comprising program instructions executable in the client computing device that, when executed, further causes the client computing device to determine that the image has enterprise content based on the confidence score associated with the at least one image tag.

8. A non-transitory computer-readable medium embodying program instructions executable in a client computing device that, when executed by the client computing device, cause the client computing device to:
   identify an action that stores an image in a memory associated with the client computing device;
   generate at least one image tag that describes the image;
   determine that the image has enterprise content based on the at least one image tag and an image capture location for the image being within an enterprise location area;
   determine that an enterprise policy applies to the enterprise content, the enterprise policy specifying that the image should be deleted from the memory of the client computing device;
   store the image in a secured data store; and
   delete the image from the memory of the client computing device.

9. The non-transitory computer-readable medium of claim 8, wherein the program instructions, when executed by the client computing device, further cause the client computing device to:
   extract text from the image;
   identify a plurality of text components from the extracted text; and
   store the plurality of text components in a template associated with an enterprise category associated with the at least one image tag, the template being stored in the secured data store.

10. The non-transitory computer-readable medium of claim 8, wherein the image is stored in a data store associated with a management service with which the client computing device is enrolled as a managed device.

11. The non-transitory computer-readable medium of claim 8, wherein the action comprises capturing of the image using an image capture device coupled to the client computing device.

12. The non-transitory computer-readable medium of claim 8, wherein the action is detected using a content observer function associated with a photo library and executed by an operating system of the client computing device.

13. The non-transitory computer-readable medium of claim 8, wherein the at least one image tag is associated with at least one of a plurality of enterprise categories, the plurality of enterprise categories comprising at least one of a receipt, a business card, presentation materials, a commercial graphic, and meeting notes.

14. The non-transitory computer-readable medium of claim 13, wherein program instructions, when executed by the client computing device, further cause the client computing device to determine that the image is associated with one of the plurality of enterprise categories based at least in part on a confidence score associated with the at least one image tag.

15. A computer-implemented method, comprising:
   identifying an action that stores an image in a memory associated with a client computing device;
   generating at least one image tag that describes the image;
   determining that the image has enterprise content based on the at least one image tag and an image capture location for the image being within an enterprise location area;
   determining that an enterprise policy applies to the enterprise content, the enterprise policy specifying that the image should be deleted from the memory of the client computing device;
   storing the image in a secured data store; and
   deleting the image from the memory of the client computing device.

16. The computer-implemented method of claim 15, wherein the action comprises capturing of the image using an image capture device associated with the client computing device.

17. The computer-implemented method of claim 15, wherein the action is detected using a content observer API call associated with a photo library and executed by an operating system of the client computing device.

18. The computer-implemented method of claim 15, wherein the action is detected during an execution of a native application associated with an operating system of the client computing device.

19. The computer-implemented method of claim 15, wherein generating the at least one image tag further comprises generating a confidence score associated with the at least one image tag, wherein the confidence score represents a degree of likelihood that the at least one image tag describes the image.

20. The computer-implemented method of claim 19, further comprising determining that the image has enterprise content based on the confidence score associated with the at least one image tag.

* * * * *